United States Patent [19]
Ozeki

[11] Patent Number: 5,283,391
[45] Date of Patent: Feb. 1, 1994

[54] ADAPTER FOR WIRING

[75] Inventor: Shotaro Ozeki, Fukuoka, Japan

[73] Assignee: Saito Denki Sangyo Co., Ltd., Fukuoka, Japan

[21] Appl. No.: 716,536

[22] Filed: Jun. 17, 1991

[30] Foreign Application Priority Data

Jun. 18, 1990 [JP] Japan .................. 2-160475

[51] Int. Cl.$^5$ .............................................. H02G 3/22
[52] U.S. Cl. .................................... 174/48; 174/37; 174/151; 248/56
[58] Field of Search ............... 174/48, 49, 37, 151; 248/56; 220/507, 516, 527, 555

[56] References Cited

U.S. PATENT DOCUMENTS

| | | | |
|---|---|---|---|
| 2,686,097 | 8/1954 | Bean | 220/555 X |
| 3,590,136 | 6/1971 | Kunishi | 174/50 |
| 3,620,367 | 11/1971 | Stembel | 220/555 X |
| 3,731,448 | 5/1973 | Leo | 174/37 X |
| 3,858,746 | 1/1975 | Hirota | 220/516 |
| 4,086,736 | 5/1978 | Landrigan | 248/56 X |
| 4,099,020 | 7/1978 | Kohaut | 174/48 |
| 4,139,096 | 2/1979 | Sieger | 220/555 X |
| 4,189,619 | 2/1980 | Pedlow | 174/48 |

Primary Examiner—Leo P. Picard
Assistant Examiner—David Tone
Attorney, Agent, or Firm—Thomas R. Morrison

[57] ABSTRACT

A wiring box for arranging the cables is buried under the ground after the cables are arranged and after the box is hermetically sealed with mortar in the construction site. It is therefore desirable that the wiring box is easily assembled at the construction site. The adapter for wiring of the invention is consists of a box and partitioning walls that divide the interior of the box into a plurality of areas. Namely, insertion holes are formed in the adapter, cables are inserted in the insertion holes, and paste is charged into the areas partitioned by the partitioning walls, enabling the cables to be easily arranged.

15 Claims, 4 Drawing Sheets

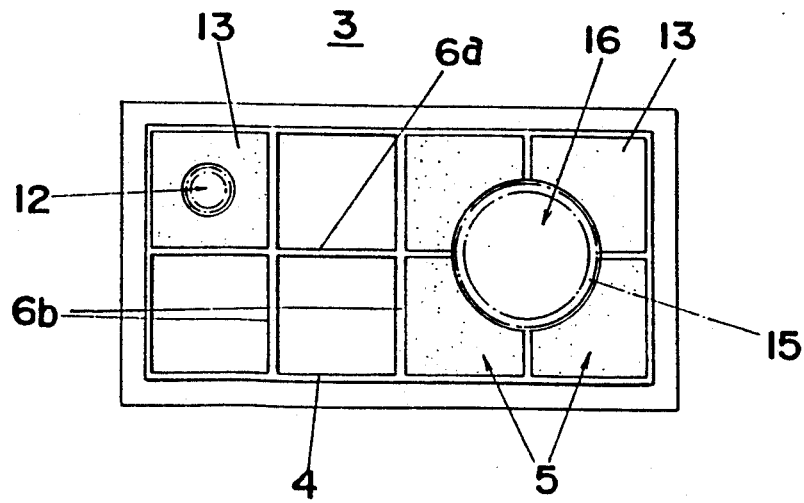
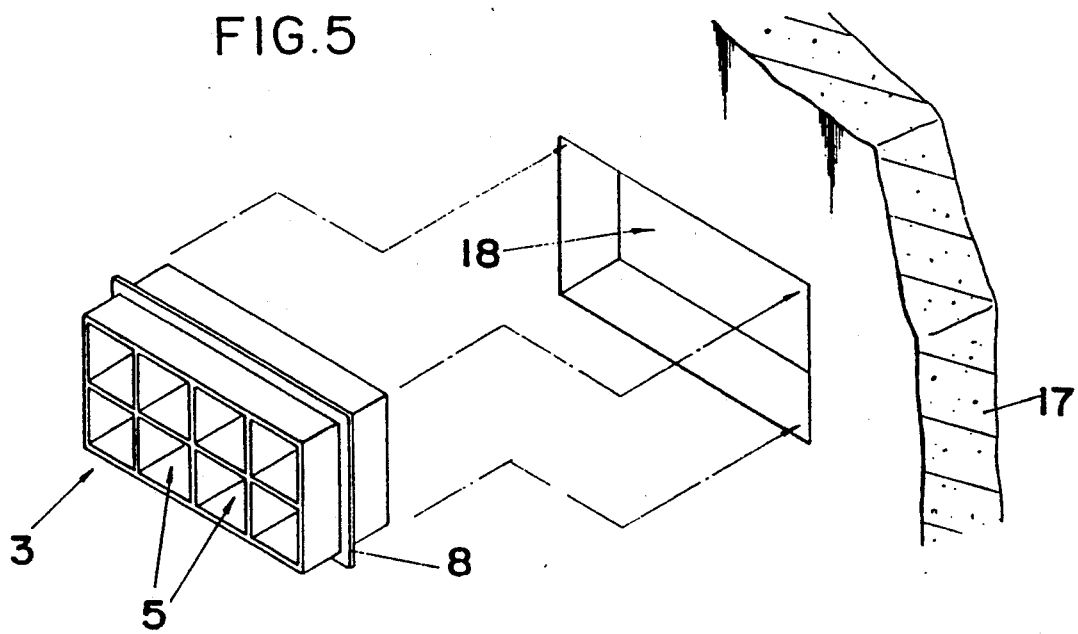

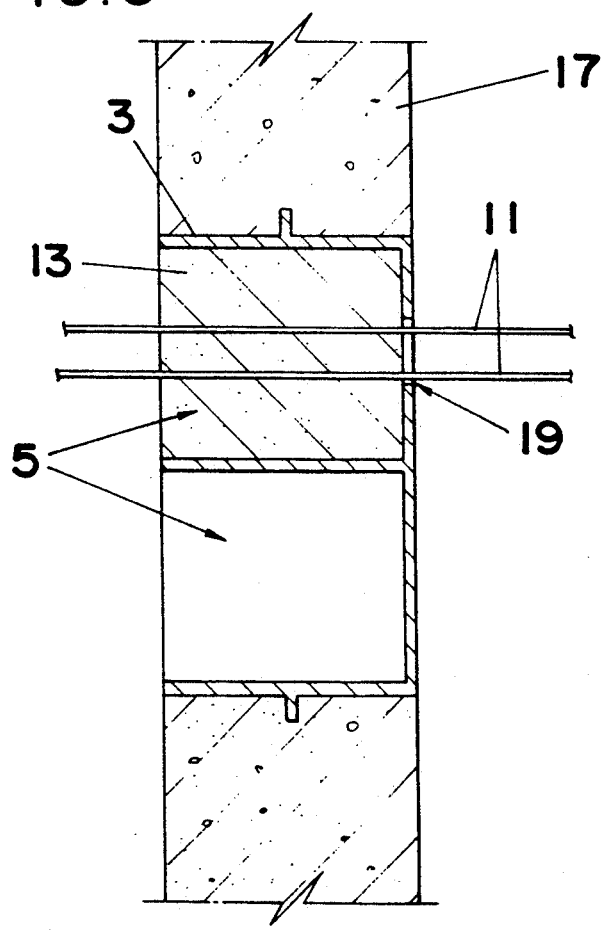

ADAPTER FOR WIRING

BACKGROUND OF THE INVENTION

1. Field of the Invention

The present invention relates to an adapter for wiring, and more specifically to the structure of an adapter for wiring which enables insertion holes for cables and cable tubes to be easily perforated and further to be easily closed hermetically.

2. Prior Art

A wiring box in which underground cables are arranged is usually made of a concrete. Prior to burying it under the ground, insertion holes are perforated in the side walls of the wiring box using a drill or the like and cable tubes are inserted in the insertion holes. When the cables are to be passed through the walls of a building insertion holes are perforated in the walls using a drill or the like.

However, the wiring boxes and walls of a building have been so rigidly constructed using concrete that extended periods of time and laborious work are needed to perforate the insertion holes. After the cable tubes and cables are inserted in the insertion holes the insertion holes are hermetically closed by applying mortar or the like often resulting in defective construction work in that the mortar is applied in varying amounts.

Summary of the Invention

The object of the present invention therefore is to provide an adapter for wiring which is free from the above-mentioned problems inherent in the prior art.

To fulfi'. the above object according to the present invention, the adapter 3 for wiring is constituted by a box 4 with a back plate 7, and partitioning walls 6 that divide the box 4 into a plurality of areas 5.

According to the above constitution, it is allowed to easily perforate insertion holes 12, 16, 19 in the adapter 3 so that cable tubes 10 and cables 11 can be inserted. After the cable tubes 10 and cables 11 are inserted in the insertion holes 12, 16 and 19, a paste 13 such as mortar or resin is charged into the areas 5 divided by the partitioning walls 6, so that the insertion holes 12, 16 and 19 are hermetically sealed reliably and that the cable tubes 10 and cables 11 are firmly secured.

BRIEF DESCRIPTION OF THE DRAWINGS

The drawings illustrate embodiments of the present invention, wherein:

FIG. 4 is a front view;
and
FIGS. 5 and 6 are a perspective view and a section view illustrating another embodiment.

DESCRIPTION OF THE PREFERRED EMBODIMENTS

Embodiments of the present invention will now be described in conjunction with the drawings.

Figure 1:
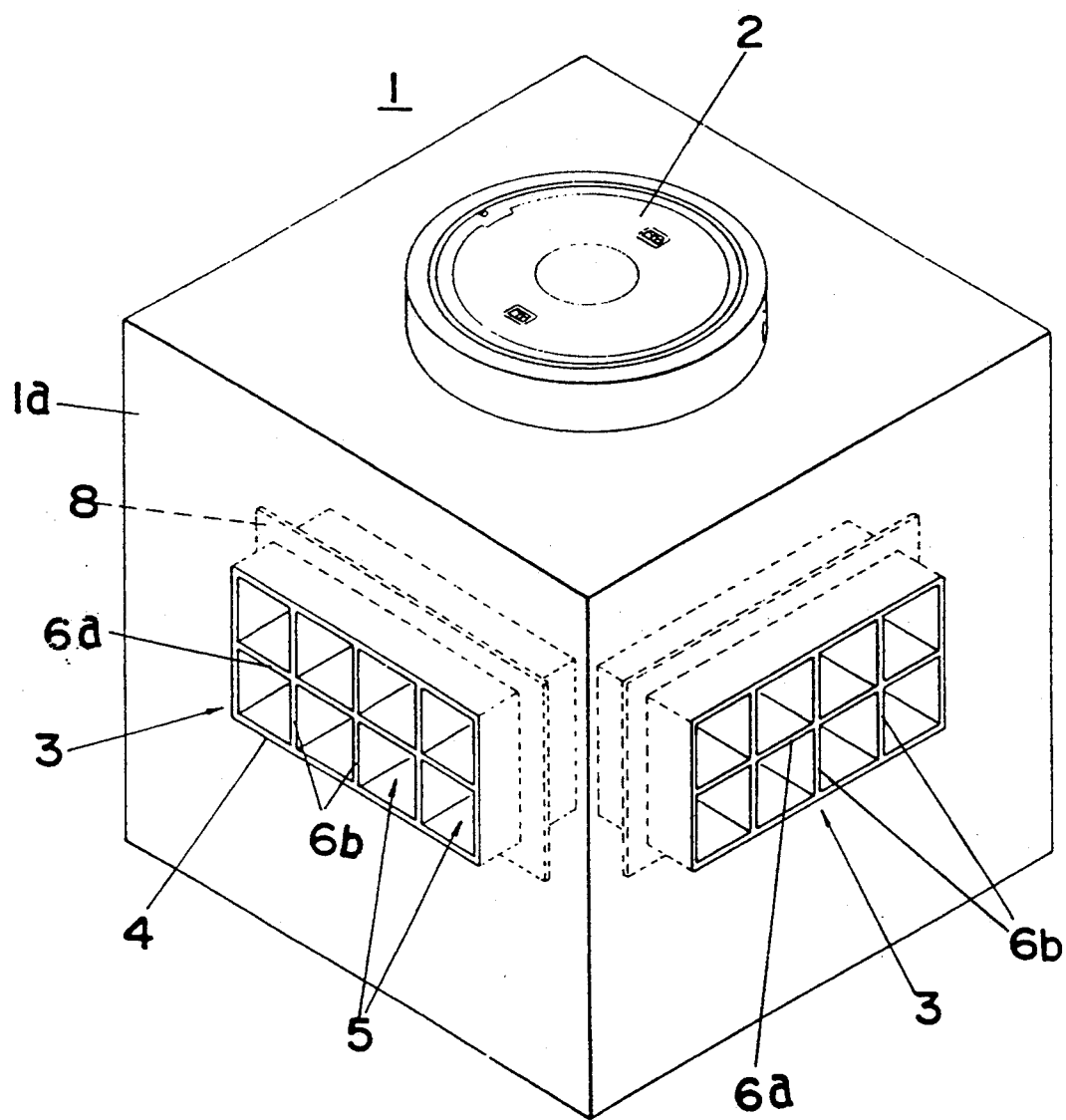
FIG. 1 is a perspective view of a wiring box.

FIG. 1 is a perspective view of a wiring box 1 which is rigidly constructed using concrete. Reference numeral 2 denotes a cap provided on the upper surface of the wiring box 1. The cap 2 is exposed over the ground surface while the wiring box 1 is buried underground.

Figure 2:
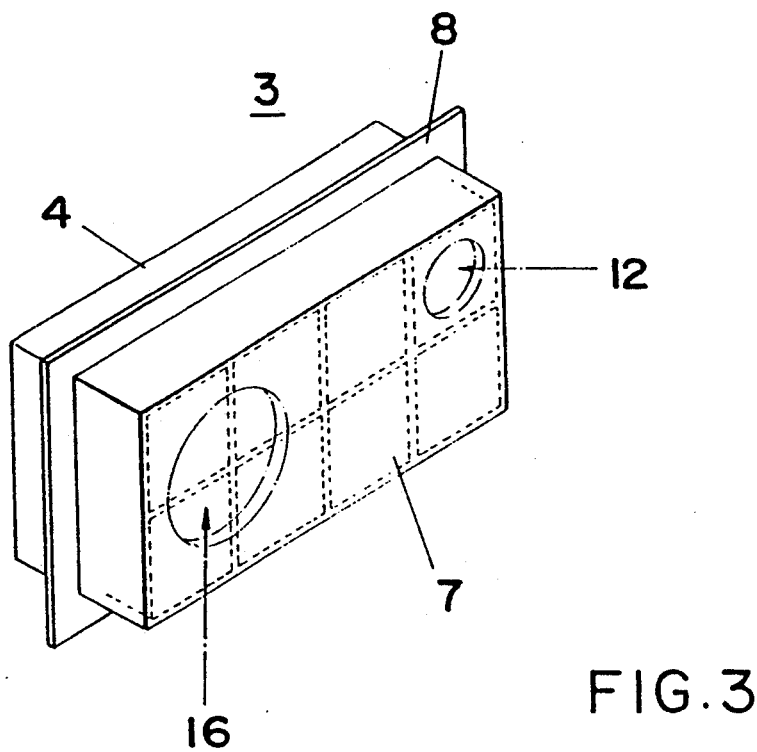
FIG. 2 is a perspective view of an adapter.

Reference numeral 3 denotes an adapter for wiring fitted to a side wall 1a of the wiring box 1. The adapter 3 chiefly consists of a box 4 in which partitioning walls 6 to are formed to divide the interior thereof into a plurality of areas 5. The partitioning walls 6 consist of partitioning wall portions 6a in the horizontal direction and partitioning wall portions 6b in the vertical direction. A back plate 7 is formed on the back surface of the box 4, and a flange 8 is formed along the periphery of the box 4 in a protruding manner (see FIG. 2).

The adapter 3 is constructed using a thin plate composed of a material such as a synthetic resin having strength smaller than that of the concrete, and permits insertion holes 12 and 16 to be easily perforated using a tool such as a drill. At the time of forming the wiring box 1 by casting the concrete, furthermore, the adapter 3 is buried therein; i.e., the adapter 3 is formed together with the wiring box 1 as a unitary structure (see FIG. 3). In this case, the flange 8 prevents the adapter 3 from escaping from the wide wall 1a, and further serves as water-proof means to prevent ground water (arrow of broken line) from entering into the wiring box 1.

Figure 3:
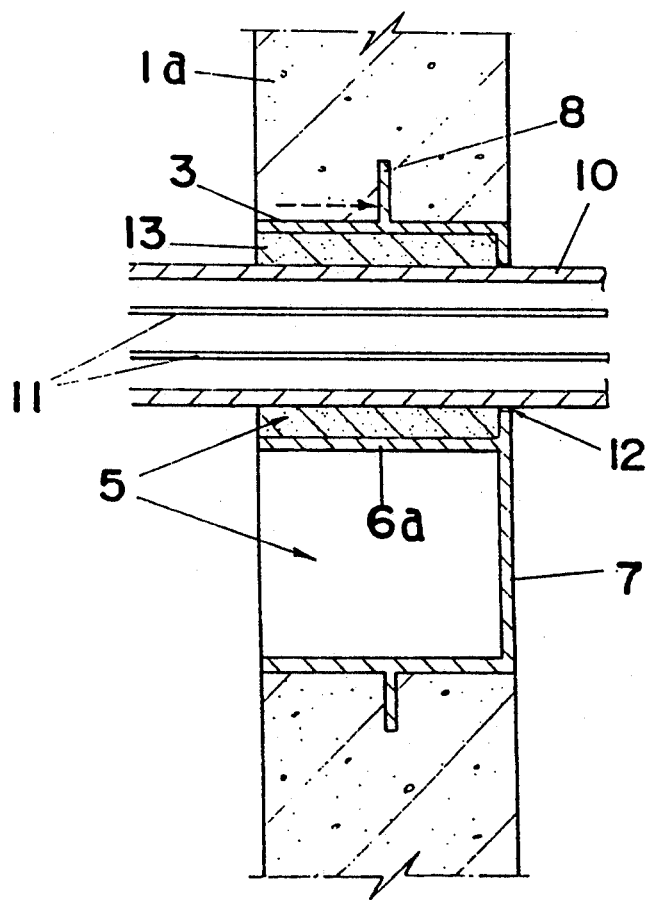
FIG. 3 is a section view.

In FIG. 3, reference numeral 10 denotes a cable tube and 11 denotes a cable running in the cable tube 10. The cable tube 10 is inserted in the insertion hole 12 perforated in the adapter 3. After it is inserted, a paste 13 such as mortar or resin is charged into the area 5 that surrounds the tube 10, and whereby the gap between the insertion hole 12 and the cable tube 10 is hermetically closed. Further, the cable tube 10 is firmly secured as the paste 13 solidifies.

As described above, the hermetic sealing is reliably accomplished without variance in the construction work by charging the paste 13 into the areas 5. When the cable tube 15 has a large diameter as shown in FIG. 4, an insertion hole 16 of a large diameter is perforated over a plurality of areas 5, and the paste 13 is charged into a plurality of areas 5 surrounding the cable tube 15. As described above, the adapter 3 of the invention makes it possible to easily arrange the cable tubes 10.

Referring now to FIG. 5 illustrating another embodiment of the present invention, reference numeral 17 denotes a concrete wall of a building, and 18 denotes an opening formed in the concrete wall 17 to which the adapter 3 will be fitted. As shown in FIG. 6, the adapter 3 is fitted to the opening 18, a cable 11 is inserted in the insertion hole 19 perforated using a drill, and the paste 13 is charged into one of the areas 5. As described above, the adapter 3 of the invention can be adapted even to the concrete wall 17 of a building or cast within a wall during the forming thereof.

According to the present invention as described above, the cable tubes and cables can be easily arranged since the adapter for wiring is constituted by the box having a back plate and by the partitioning walls that divide the box into a plurality of areas. Furthermore, the paste needs to be charged into the areas surrounding the cable tubes and cables. Therefore, the insertion holes are hermetically closed quickly and reliably without variance in the construction work, and the cable tubes and cables are firmly secured.

I claim:

1. An adapter for accommodating the passage of a wiring conduit, affixable within a wall, comprising:
   a box;
   a back plate attached to a back surface of said box;
   partitioning walls that divide an interior of said box into a plurality of areas and which are attached to the back plate and the box;

said back plate having at least one hole therein for allowing the passage of the conduit;

said hole being within an inside perimeter of said box;

at least one area, or said plurality of areas, being for the acceptance and containment of sealing material for sealing around the conduit; and wherein said partitioning walls consist of partitioning wall portions in the horizontal direction and partitioning wall portions in the vertical direction.

2. An adapted for wiring according to claim 1, wherein a means for affixing said box within a wall is one an outer surface of said box.

3. An adapter for wiring according to claim 2 wherein said means for affixing includes a flange for imbedding within the wall.

4. An adapter for wiring according to claim 2 wherein said means for affixing includes a flange around an outside perimeter of said box for effecting a seal between said adapter and the wall.

5. An adapter for wiring according to claim 4 wherein said flange extends perpendicularly outward from the box and is located on a middle region of the outer surface of said box.

6. An adapter for wiring according to claim 2 wherein said box is constructed of a synthetic resin.

7. A wiring conduit adapter insert for affixing within opposing surfaces of an opening in a wall and for facilitating sealing around a conduit passing therethrough comprising:

an enclosing perimeter wall;

partition walls attached to and within the encircling perimeter wall;

a back plate attached to back edges of the encircling perimeter wall and the partition walls;

the partition walls dividing an area enclosed by the encircling perimeter wall into a plurality of sub-areas;

said back plate having at least one hole cut therein for allowing the passage of the conduit;

the at least one hole being within an inside perimeter of said perimeter wall; and a means for affixing said adapter within the wall.

8. A wiring conduit adapter according to claim 7 wherein said means for affixing includes a flange for imbedding within the wall.

9. A wiring conduit adapter according to claim 8 wherein said means for affixing includes a continuous flange around an outside perimeter of said encircling perimeter wall for effecting a seal between said adapter and the wall.

10. A wiring conduit adapter according to claim 7 wherein said box is constructed of a synthetic resin.

11. A wiring conduit adapter according to claim 7 in combination with the wall, wherein an outside of said perimeter wall is maintained in contact with the opposing surfaces of the opening in the wall.

12. A wiring conduit adapter according to claim 7 wherein said at least one hole is cut through both the back plate and the partition walls where the conduit has a larger cross section than each of the sub-areas.

13. A wiring conduit adapter according to claim 7 further comprising:

the conduit; and a sealing material packed around the conduit and contained within the sub-areas through which the conduit passes.

14. A method of installing wiring conduit through a concrete wall comprising:

casting a wiring conduit adaptor into a wall;

cutting a hole through a back plate of the adaptor and partition walls of the adaptor where required to accommodate the conduit size;

inserting the wiring conduit through the hole in the adaptor; and

'ing areas encompassed by the partitions, through which the conduit passes, with a sealing material so as to effect a seal between the wiring conduit and the adaptor wherein only so much sealing material is used as is necessary to fill the areas immediately surrounding the wiring conduit.

15. A method according to claim 14 wherein the step of casting comprises:

supporting the adaptor at a desired location within a wall mold; and pouring concrete in the mold so as to encompass the adaptor and result in flanges of the adaptor being imbedded within the wall.

* * * * *